United States Patent [19]

Aoe et al.

[11] Patent Number: 5,555,427
[45] Date of Patent: Sep. 10, 1996

[54] DISTRIBUTED PROCESSING IN A SYSTEM OF COMPUTERS AT TERMINALS CONNECTED BY A COMMUNICATION NETWORK

[75] Inventors: Shigeru Aoe, Tokyo; Gen Kakehi; Tadamitsu Ryu, both of Yokohama, all of Japan

[73] Assignee: Fujitsu Limited, Kawasaki, Japan

[21] Appl. No.: 743,390

[22] PCT Filed: Dec. 21, 1990

[86] PCT No.: PCT/JP90/01680

§ 371 Date: Aug. 19, 1991

§ 102(e) Date: Aug. 19, 1991

[87] PCT Pub. No.: WO91/10191

PCT Pub. Date: Jul. 11, 1991

[30] Foreign Application Priority Data

Dec. 26, 1989 [JP] Japan ..................... 1-337031
Dec. 26, 1989 [JP] Japan ..................... 1-337032

[51] Int. Cl.$^6$ ........................................ G06F 15/16
[52] U.S. Cl. ............ 395/800; 395/62; 395/200.08; 395/200.15; 395/133; 364/940.71; 364/DIG. 1
[58] Field of Search .................. 395/800, 400, 395/425, 375, 600, 650, 725, 200; 364/DIG. 1, DIG. 2

[56] References Cited

U.S. PATENT DOCUMENTS

| | | | |
|---|---|---|---|
| 4,506,111 | 3/1985 | Tekenouchi et al. | 172/2 A |
| 4,943,932 | 7/1990 | Lark et al. | 395/76 |
| 5,008,853 | 4/1991 | Bly et al. | 395/153 |
| 5,036,459 | 7/1991 | den Haan et al. | 395/800 |
| 5,075,845 | 12/1991 | Lai et al. | 395/425 |
| 5,095,522 | 3/1992 | Fujita et al. | 395/200 |
| 5,133,075 | 7/1992 | Risch | 395/200 |

OTHER PUBLICATIONS

Jalole, "Resilient Objects in Broadcast Networks" IEEE Transaction on Software Engineering, vol. 15 No. 1, Jan. 1989, pp. 68–72.

E. Jul et al., "Fine–grained mobility in the Emerald system", ACM Transactions on Computer Systems, vol. 6, No. 1, Feb. 1988, pp. 109–133.

(List continued on next page.)

Primary Examiner—Alyssa H. Bowler
Assistant Examiner—Dzung C. Nguyen
Attorney, Agent, or Firm—Staas & Halsey

[57] ABSTRACT

A system for distributing processing between terminals ($T_1 \sim T_n$) connected via a communication network (30). Each terminal ($T_i$) is provided with at least one method group (32) and a memory unit (34) to store data files. An originating terminal, e.g., terminal ($T_1$) accesses data elsewhere in the distributed system by generating a message. The message includes a terminal code identifying an object to access a terminal ($T_2$) to execute an object, a method code identifying a method for accessing the data and a command name containing or identifying the desired data. The terminal, e.g., terminal ($T_2$), containing the desired data, decodes the message and accesses a data file in the memory unit (34) containing the desired data identified by the command name. The message may also include a selector and reset conditions which control the sequence of data processing in the terminals ($T_0$ and $T_n$) so that the processing of the originating ($T_1$) and data accessing ($T_2$) terminals can be coordinated. When the processing identified by the method code is completed in the data accessing terminal ($T_2$), a message including the resulting data is sent from the data accessing terminal ($T_2$) to the originating terminal ($T_1$). Objects according to the present invention may contain a method without data and may be transmitted from one terminal to another as data. Thus, any application or operating system program can be replaced or added by transmitting an object containing that program as data.

18 Claims, 8 Drawing Sheets

OTHER PUBLICATIONS

S. T. Krolak et al., "DEOS–A dynamically extendible object-oriented system", *Microprocessing and Microprogramming*, vol. 24, No. 10–5, 'Supercomputers: Technology and Applications', 14th EUROMICRO Symposium on Microprocessing and Microprogramming, Aug. 29–Sep. 1, 1988, pp. 241–248.

J. A. Dysart, "The new wave object management facility" *Hewlett–Packard Journal*, vol. 40, No. 4, Aug. 1989, pp. 17–23.

DISTRIBUTED PROCESSING IN A SYSTEM OF COMPUTERS AT TERMINALS CONNECTED BY A COMMUNICATION NETWORK

TECHNICAL FIELD

The present invention is directed to object oriented distributed processing in a system of computers at terminals connected by a communication network and, more particularly, to communication between objects stored and executed in the terminals to perform processing of software.

BACKGROUND ART

In conventional distributed data processing systems, if a first terminal requires data stored in a second terminal, the first terminal requests the data and the second terminal transmits the data to the first terminal so that the first terminal can process the data. The transmission of raw data which is typically higher in volume than processed data requires a high capacity communication network and limits the number of terminals which can be connected together before significantly reducing overall throughput of the system.

Large distributed processing systems contain a large number of terminals, each having its own computer system. When changes are made to the operation of the distributed processing system, the computer system at each terminal must be updated. Most conventional distributed processing systems do not have the capability to update the operating system of the computer systems at the terminals via the communication network.

In computer systems using object oriented architecture, abstracted data (instance) and a program (method) specifying processing of the data are together treated as an object. Data processing is carried out by processing the methods in such objects and communicating messages therebetween. In object oriented processing, wherever the data is located, procedures for processing the data will be located also. Execution of these procedures is triggered by message transfer between objects, including the transmission of resulting data in messages after processing of data in an object is completed.

Applying object oriented techniques to a distributed data processing system is not easily accomplished due to the need to maintain the linkage between data and method of an object, to determine where an object is located and to communicate between objects. One way of implementing object oriented techniques in a distributed processing system is to maintain a database in each terminal of the objects in all of the terminals. In a large system, this requires a large amount of overhead due to the size of the memory required and the time and communication traffic required to update the object location database in each of the terminals.

An object of the present invention is to provide object oriented processing in all terminals of a distributed processing system, executed as if in a single processing system.

Another object of the present invention is to provide a system for distributed data processing in which objects can be obtained by one terminal from another terminal without maintaining an object location database in all terminals.

A further object of the present invention is to provide a distributed processing system capable of transmitting changes to the operating system programs of the distributed processing system to the terminals via the communication network of the distributed processing system.

Yet another object of the present invention is to provide a method for linking objects regardless of their location or content.

DISCLOSURE OF INVENTION

In a distributed processing system having a plurality of terminals connected via a communication network, object oriented processing is performed by communicating via messages containing a terminal code, a method code identifying processing of data and a command containing data or identifying data in an object to be processed. The method identified by the method code is executed by the terminal identified by the terminal code. Messages may contain multiple submessages, where each submessage includes a terminal code, a method code and a command. The command may identify an object in one terminal which is to be installed in the terminal identified by the terminal number. This object may be a new program or a replacement for an existing program in the terminal identified by the terminal number. The program may be an application program or an operating system program. Objects may contain methods without data, thereby permitting any type of program to be updated.

The terminal code may identify an object for transmitting the message to the terminal where the object identified by the object code is located. If the terminal code is zero or null, the object will be looked for in the terminal in which the object generating the message is executing. If the terminal number is unknown, the object identified by the terminal code will identify an object which will perform processing to locate the object in one of the other terminals on the system.

The command in the object code may include a selector condition and a reset condition for identifying how the method identified by the method code is to be initiated and how to proceed when the sequence starting with the method identified by the method code has completed execution, respectively. The command code may contain a message for identifying an object for obtaining data for the method identified by the method code to process in the terminal identified by the terminal code.

These objects, together with other objects and advantages which will be subsequently apparent, reside in the details of constitution and operation as more fully hereinafter described and claimed, reference being had to the accompanying drawings forming a part hereof, wherein like reference numerals refer to like parts throughout.

BEST MODE OF CARRYING OUT THE INVENTION

Figure 1:
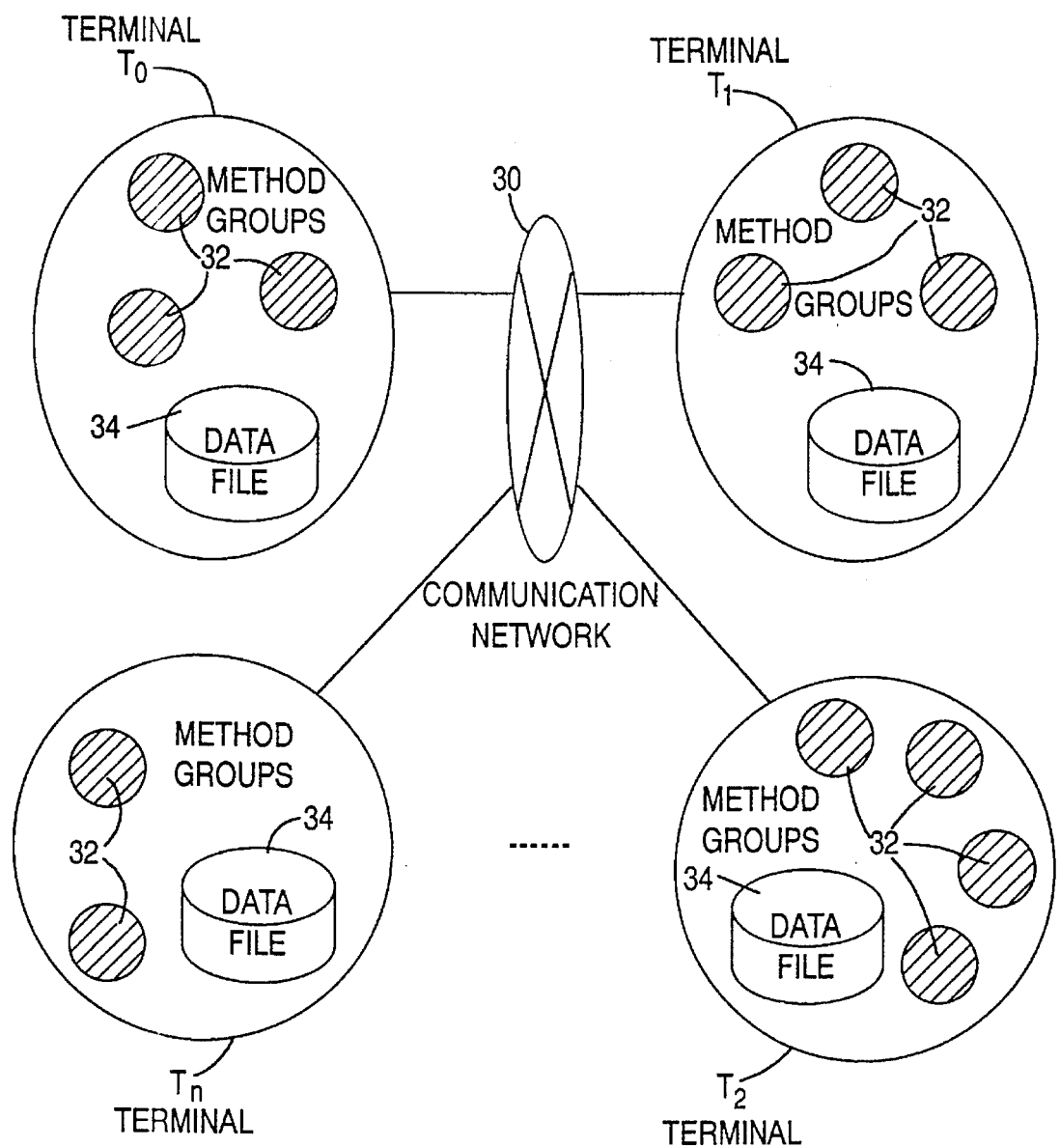
FIG. 1 is a block diagram of a distributed processing system to which the present invention can be applied.

As illustrated in FIG. 1, a plurality of terminals $T_0 \sim T_n$ are connected via a communication network 30, such as a local area network (LAN), intelligent network (IN), integrated services digital network (ISDN). In the case of ISDN, a dedicated line is preferably used for carrying supervisory information, while object commands and responses thereto are communicated by ISDN. Each terminal $T_i$ has program modules stored in method groups 32 and data stored in a data file 34. An object executes in one of the terminals by executing the program stored in one of the method groups and identified as being the method for that object. When the method is instructed to begin execution of another object, e.g., to obtain data from the second object, a message is generated having the general format G below $$G = \{(T_i: M_j, I_k); (T: M_m, I_n); \ldots \},$$

where $T_i$ is a terminal code, $M_j$ a method code and $I_k$ the name of an instance and any one or two of the ($T_i$, $M_j$ and $I_k$) may be missing, as described below.

Figure 2:
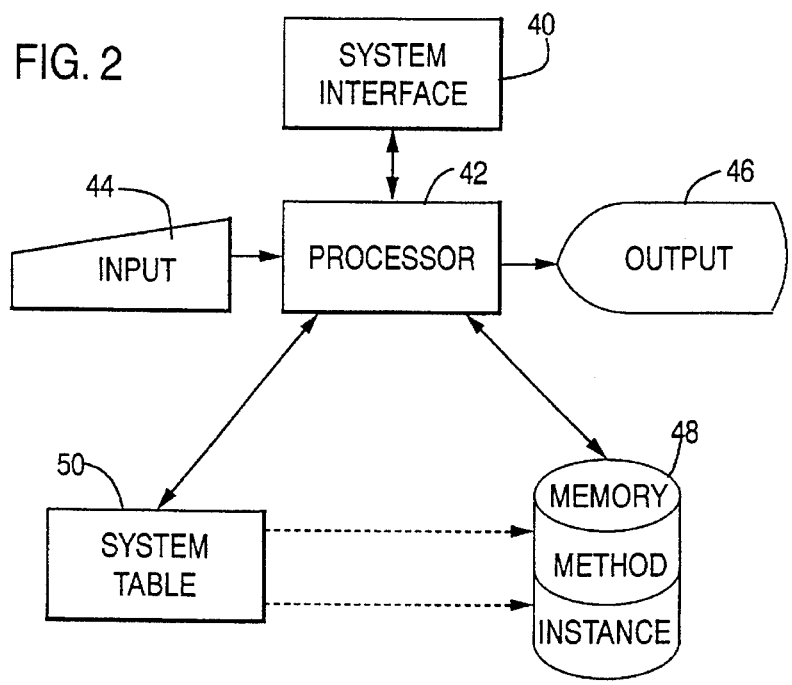
FIG. 2 is a block diagram of one of the terminals.

Each terminal $T_i$ includes the components illustrated in FIG. 2. A system interface 40 is connected to the communication network 30. A processor 42 receives input from an operator via an input device 44 which may be a keyboard or other peripheral, including graphic tablet, tape or floppy disk drive, etc. An output device 46, such as a CRT display, printer, the tape or floppy disk drive, etc., provides output to the operator. The objects (methods and instances) are stored in a memory unit 48, such as a hard disk drive, and are addressed by a system table 50 which may be stored in the memory unit 48 and in random access memory (not shown) in the processor 42. An example of a commercial embodiment of the terminal illustrated in FIG. 2 is a personal computer.

Figure 3:
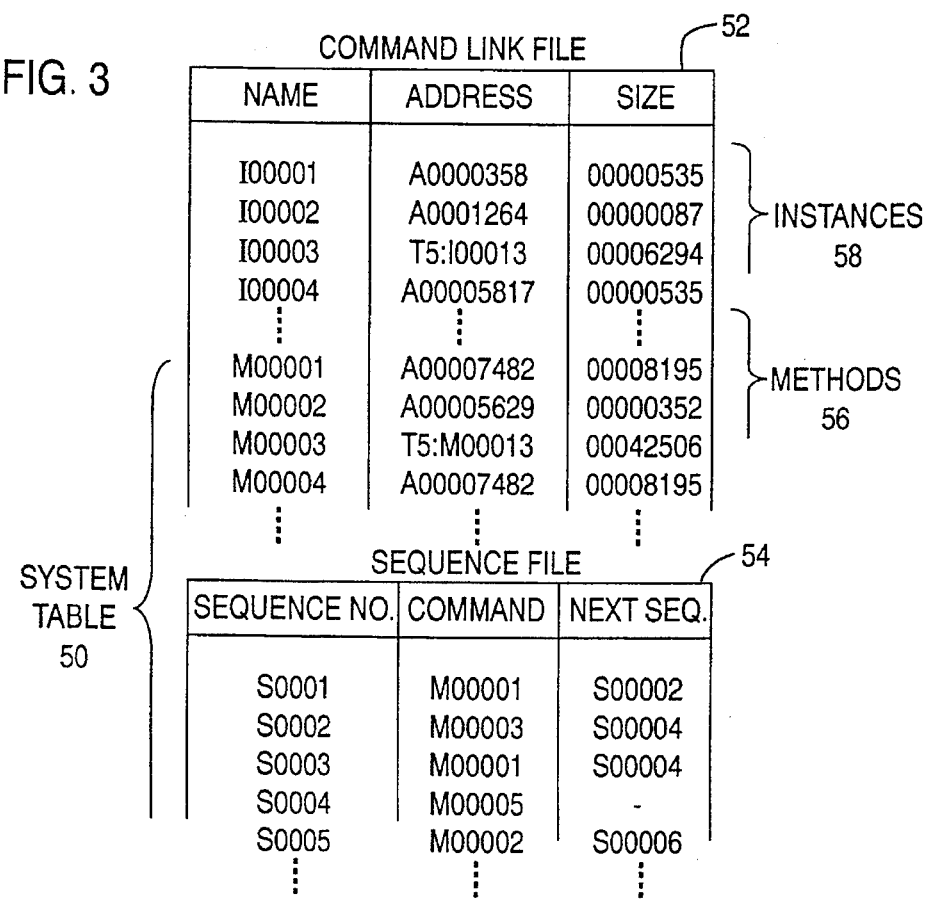
FIG. 3 is a chart of the command link and sequence files.

The system table 50 is one of the most important tables in each terminal $T_i$. As illustrated in FIG. 3, the system table includes part of a command link file 52 and all of a sequence file 54. The command link file 52 stores the location and size of all objects stored in the memory unit 48. The method entries 56 in the command link file 52 are included in the system table because they identify the programs which constitute and can be executed by the system controlling the operation of the terminal $T_i$. The command link file 52 also includes instance entries 58 which identify the location and size of data stored in the memory unit 48.

When the message G above is received by terminal $T_i$, the object may be interpreted method M00003 and instance I00003. The processor 42 can retrieve the method M00003 and instance I00003 by accessing the system table 50 to determine their address and size, as indicated by the dashed lines in FIG. 2.

The command link file 52 permits the same block of code or data to be used in more than one object. In the example illustrated in FIG. 3, methods M00001 and M00004 have the same address and size. However, the instances, I00001 and I00004, forming objects with these methods are stored in different locations, although they are the same size. Thus, the same method (stored at address A00007482) can be used to process different data, depending on which name (M00001 or M00004) is used. Similarly, the same data can form different objects by being combined with different methods. For example, one method may transfer data to or from the terminal $T_i$, while another method processes the same data in the terminal $T_i$.

Figure 4:
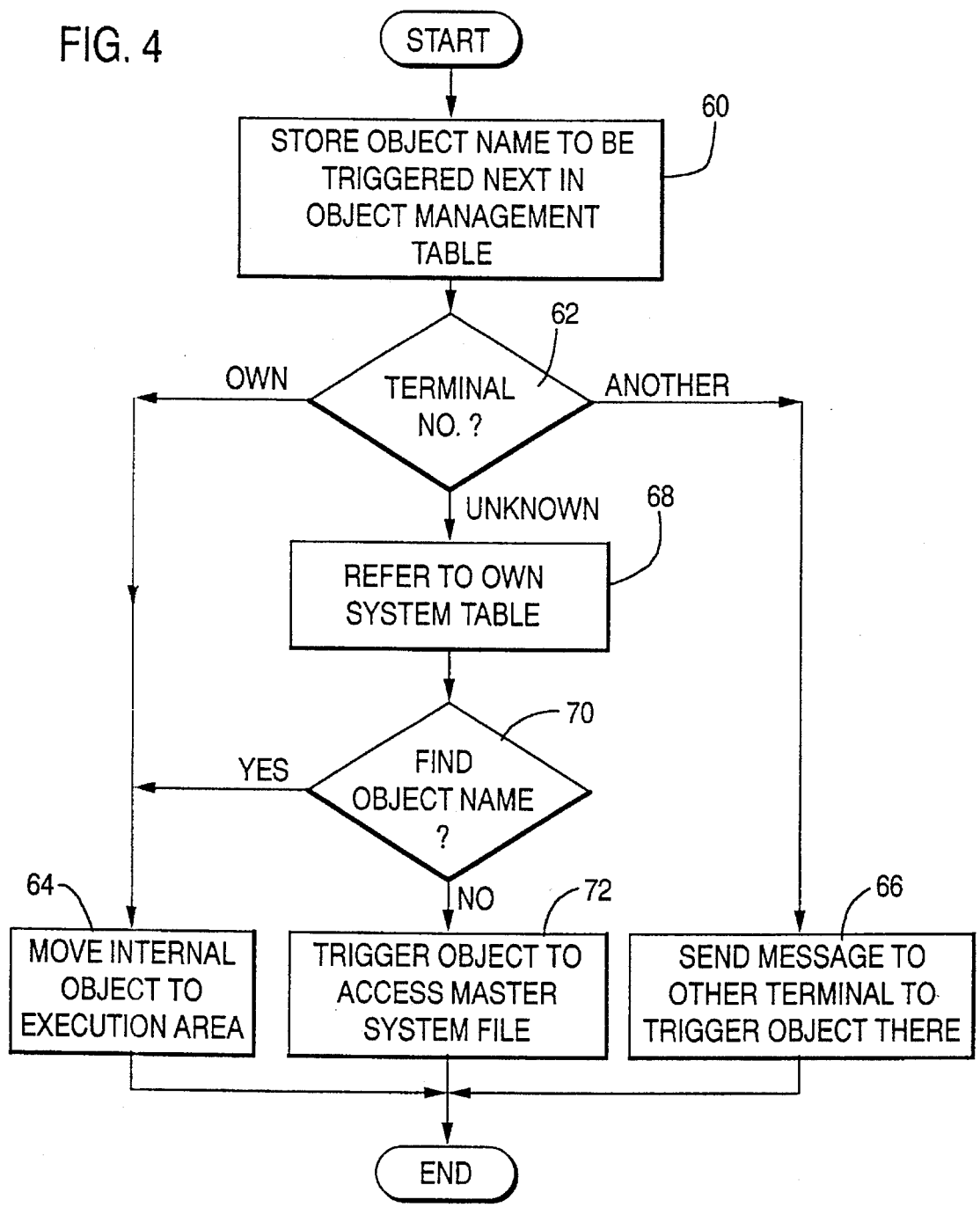
FIG. 4 is a flowchart of processing to locate an object according to the present invention.

When a new object is to begin control of the processor 42, the processing illustrated in FIG. 4 is executed. First, the new object name is stored 60 in an object management table. Next, the terminal number associated with this object in the message controlling the triggering of the new object, is compared 62 with the terminal number, e.g. $T_1$, of the terminal performing this process. If there is a match and the address in the command link file 52 indicates the method is stored in terminal $T_1$, the object is moved 64 from the memory unit 48 to the execution area (not shown) in the processor 42. When the terminal number associated in the message with the new object name does not match 62 the terminal number of the terminal performing this process or the address of the method and instance of an object refer to another terminal as indicated for object 000003 (method M00003 and instance I00003), a message is sent 66 to the terminal, e.g. $T_2$, identified in the message or address field of the command link file to trigger the object in that terminal ($T_2$). This is done by triggering an object with the same name as the terminal number ($T_2$) in the terminal $T_1$ executing the process illustrated in FIG. 4.

When the terminal number indicates that the terminal in which the object to be executed is unknown, first the system table 50 of the terminal ($T_1$) executing the process is checked 68 for the object name. If the object name is found 70, the object is moved 64 to the execution area of the processor 42. If the object name is not found 70, an object is triggered to access a master system file. The master system file keeps a record of the location of all objects. The master system file may be located in the communication network 30 or in one of the terminals (a server). Alternatively, a copy of the master system file may be located in each of the terminals. However, this last alternative requires a significant amount of overhead to maintain the master system file.

Figure 5:
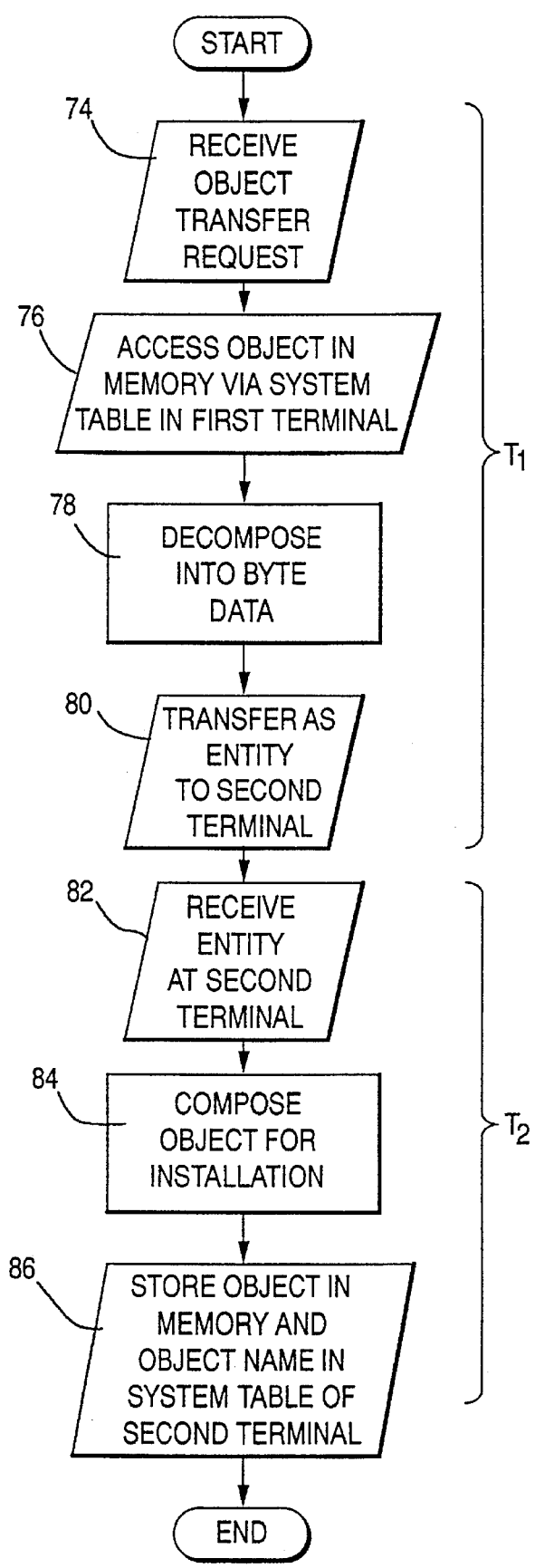
FIG. 5 is a flowchart of processing to update a program in a remote terminal.
Figure 6:
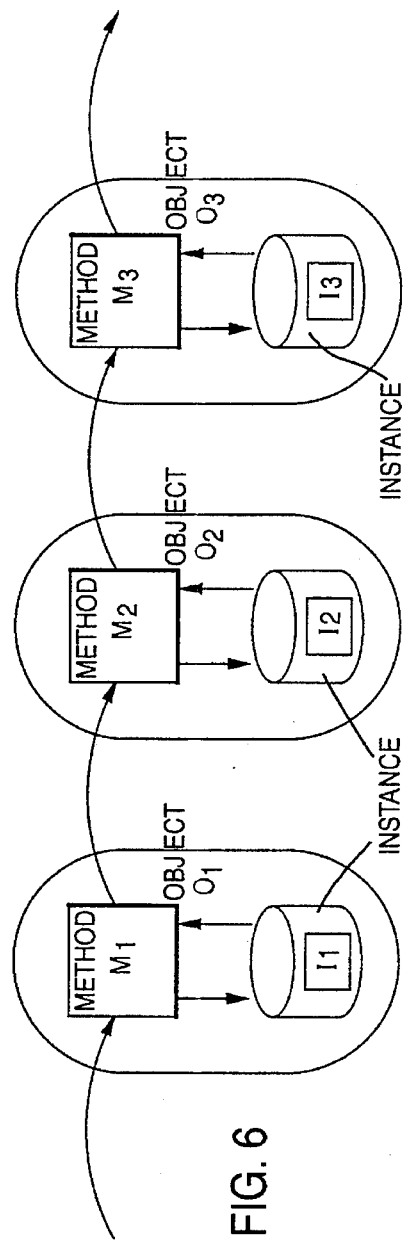
FIG. 6 is a flow diagram of object sequencing in the prior art.

When an object is located in a different terminal, the object may be executed there or transferred to another terminal, including a terminal requesting its execution. In the preferred embodiment, when an object not presently stored in a terminal is desired to be executed, the object will be executed in the terminal in which it is stored. To provide other terminals with an object stored in terminal $T_1$, for example, the processing steps illustrated in FIG. 5 are executed. This process is termed a learning method and may be used to transfer any application programs or system programs when all are in the form of objects.

As illustrated in FIG. 5, when an object transfer request is received 74 by terminal $T_1$, e.g. via the input device 44, the requested object is accessed 76 in memory unit 48 via the system table 50. The object is decomposed 78 in byte data for transfer 80 as an entity to the second terminal, e.g. terminal $T_2$. Depending upon the type of transfer request received, the entire object may be transferred 80 after decomposition, or only the method or data in the object. The requested portion or entirety of the object is transferred 80 by transmitting a message including the object (or portion thereof) as entity data. Terminal $T_2$ receives 82 the message including the entity data, composes 84 the object for installation and stores 86 the object in the memory unit 48 in terminal $T_2$. In addition, the system table 50 in terminal $T_2$ is updated 86 with the object name. If the object name previously existed in the system table, the address and (if necessary) size of the object will be updated to reflect the object just stored.

The sequence file 54 (FIG. 3) enables predefined sequences of methods to be stored in the system table 50. As an alternative to the message format G above, a simplified message format $G_1$ may be used, where $sf_i$ is $$G_1=\{T_i:O_i, sf_i; T_{i+1}:O_{i+1}, sf_{i+1} \ldots \}$$

a sequence flag indicating that the preceding object name is a sequence number which should be looked for in the sequence file 54. For example, if $O_i$ in $G_1$ is S00001, methods M00001, M00003 and M00005 will be executed in sequence. In a first alternative embodiment, the object name may identify a method and the command fields of the sequence file 54 will be searched for the corresponding method name when the sequence flag is set. In this embodiment, each method may be limited to a single entry in the sequence file or some rule, such as first occurrence in the file may be used to find the right sequence. In this case each method may appear in as many sequences as desired, but should start only one sequence. In a second alternative embodiment, the sequence flag may be a sequence number identifying the starting point of the sequence. In this embodiment, the object name can be used to access the first method and instance while the sequence is being determined.

Another way of sequencing objects according to the present invention is to use common objects. In the prior art, the only way to sequence objects was to link one object to the next as illustrated in FIG. 5. According to the present invention, messages may have the format $G_2$ including a selector condition $s_i$ and a $$G_2=\{T_i:(O_i, s_i, r_i); T_{i+1}:(O_{i+1}, s_{i+1}, r_{i+1}) \ldots \}$$

reset condition $r_i$. According to the present invention, common objects permit the same object to be used in different ways by different objects and to predefine a variety of sequences in the common objects themselves instead of in a sequence file. The selector condition $s_i$ defines an entry point in the common object $O_i$. The reset condition $r_i$ defines how the sequence ends.

It should be noted that common objects are not limited to use in forming sequence objects. Sequence objects have a defined structure with a beginning and end. On the other hand, common objects have a defined function and can be executed whenever that function is required. For example, common objects can be used in the kernel of an operating system to perform functions whenever needed.

Figure 7:
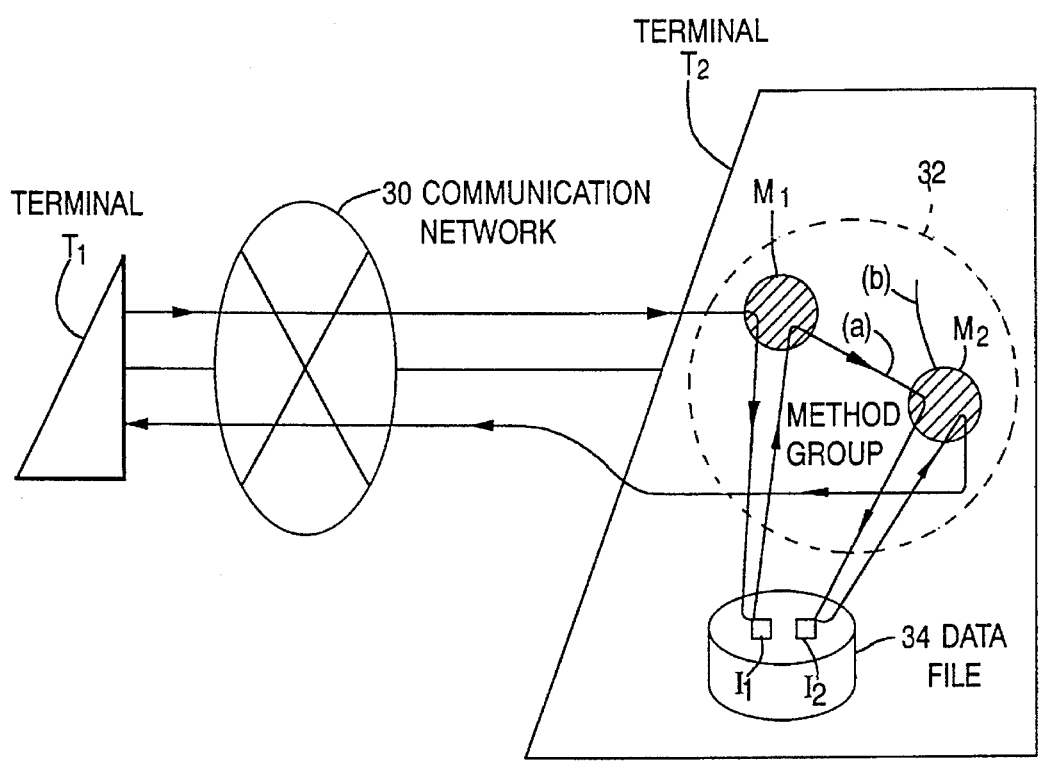
FIG. 7 is a conceptual block diagram of processing in a terminal having an object required by another terminal and illustrating the use of common objects.

A very simple example of the use of common objects in sequence will be provided first with reference to FIG. 7 and message $G_3$ below. The beginning of message $G_3$ instructs $$G_3=\{T_2:O_1; T_2: (O_2, a, r)\}$$

terminal $T_1$ that objects are to be executed in terminal $T_2$ and so message $G_3$ is transmitted to terminal $T_2$ by executing an object called $T_2$ in terminal $T_1$. Terminal $T_2$ decodes the message $G_3$ to determine that for the first object $O_1$ method $M_1$ is to be executed using the data in instance $I_1$ and then a second object $O_2$ is to be performed using method M2, by entering at (a), as identified by the selector condition a. The data in instance $I_2$ is processed by method $M_2$ and then processing returns to terminal $T_1$, as identified by the reset condition r. No selector or reset condition is provided for object $O_1$, because there is a single entry and exit point for object $O_1$.

Figure 8:
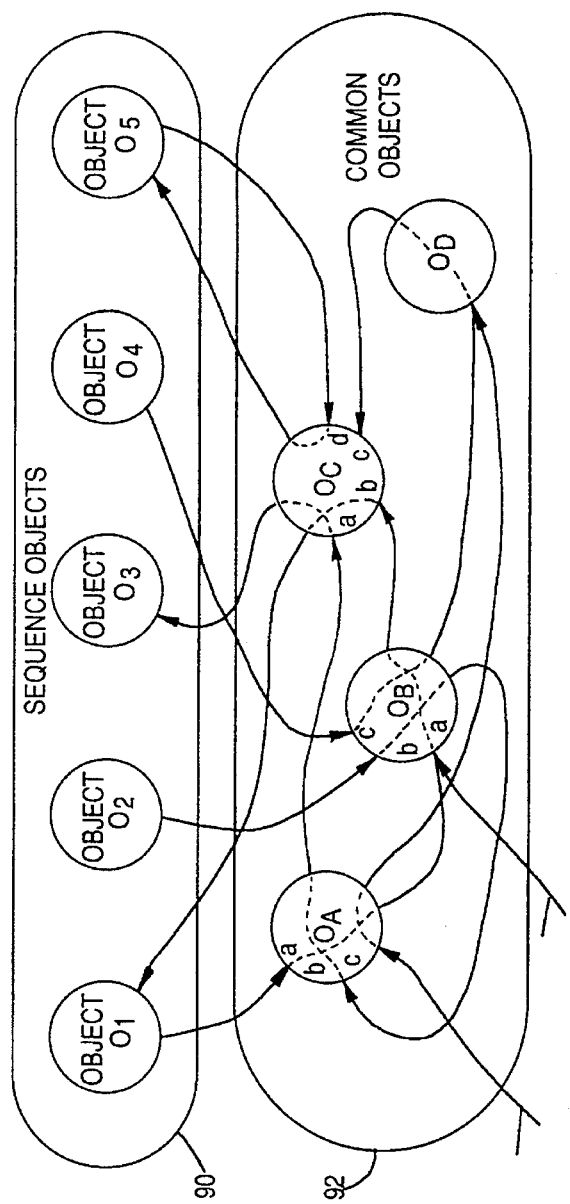
FIG. 8 is a flow diagram of object sequencing using common objects according to the present invention.

An example of a few sequence objects 90 and common objects 92 are illustrated in FIG. 8. Common objects $O_A$, $O_B$, and $O_C$ have three entry points, a, b and c, and three exit points, but common object $O_C$ has an extra entry point and common object $O_D$ has only one entry and exit point. Processing of the common objects illustrated in FIG. 8 will be discussed with reference to the flowchart illustrated in FIG. 9.

Figure 9:
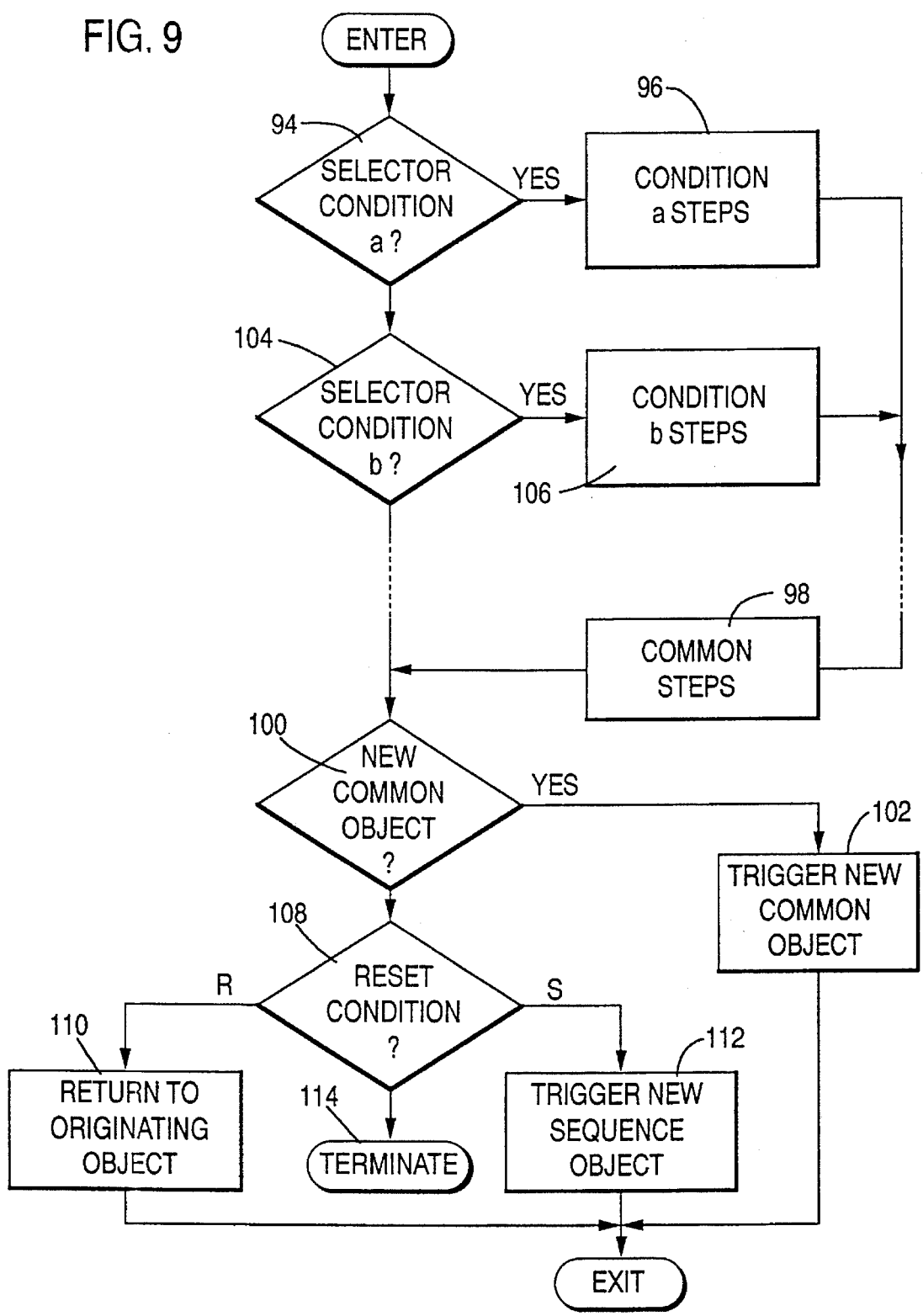
FIG. 9 is a flowchart of sequencing using common objects according to the present invention.

First taking as an example the sequence initiated by sequence object $O_1$, common object $O_A$ is triggered with selector condition a and a reset condition to return to the originating object ($O_1$). Since the selector condition is a, the selector condition matches in the test 94 for condition a, and the appropriate condition steps 96 are executed. After any common steps 98 are executed, it is determined 100 whether a new common object should be triggered. As indicated by the dashed line across object $O_A$ from entry point a, in this example, common object $O_B$ is to be triggered 102 with selector condition a. The reset condition is passed on in the message which triggers common object $O_B$. The same steps of FIG. 9 are executed in common object $O_B$ and a message is generated to trigger common object $O_C$ with selector condition b and the same reset condition.

In common object $O_C$, it will be determined 94 that the selector condition is not a, but a match will be found in the test 104 for selector condition b. Therefore, the steps 106 for condition b will be executed prior to the common steps 98. As indicated by the dashed line entering common object $O_C$ at b, it will be determined 100 that there are no more common objects to be executed and so the reset condition will be tested 108. As noted above, the reset condition in the message generated by sequence object $O_1$ was to return to the originating object. This reset condition is passed to common object $O_C$ and therefore processing will return 110 by referencing the object management table to determine the originating object.

Processing of the other sequences illustrated in FIG. 8 is similar. The sequence originating with sequence object $O_2$ uses selector condition b in common object $O_B$ and proceeds to use the same selector condition in common object $O_A$. At the end of the sequence, common object $O_C$ is triggered with selector condition a. The reset condition in the originating message from sequence object $O_2$ indicates that a new sequence object $O_3$ is to be triggered 112 by the final common object $O_C$ in the sequence. The sequence originating in sequence object $O_4$ passes through common objects $O_B$ and $O_D$ before terminating 114 in common object $O_C$.

Figure 10:
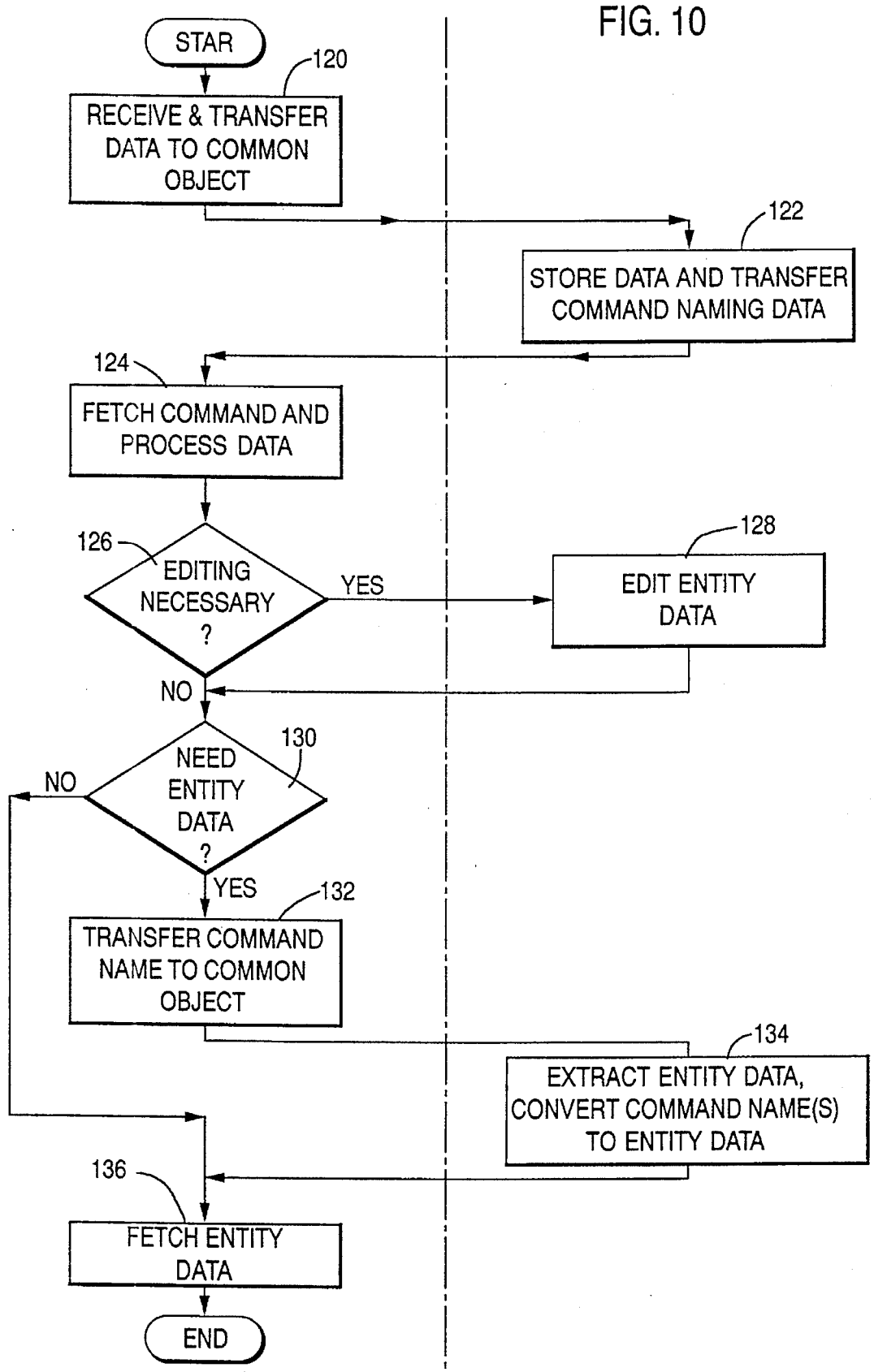
FIG. 10 is a flowchart of processing using common objects according to the present invention.

An example of the use of common objects is provided in the flowchart illustrated in FIG. 10. The operations of sequence objects appear on the left side of FIG. 10, while the operations of common objects appear on the right. One or more sequence objects are used to receive and initiate transfer 120 of data to a common object. Thus, unique input routines are used to interface with an operator or a peripheral device inputting application specific data. A common object is used to store 122 the data. The common object transfers 122 a command name, identifying the data, to a sequence object. The sequence object fetches the command and processes 124 as required by the application. If it is determined 126 that editing is necessary, general purpose editing routines stored as one or more common objects can be used to edit 128 the data.

After any necessary editing, it is determined 130 whether any existing entity data is needed. If so, a command name is transferred 132 to another common object which extracts 134 the entity data and converts command names to entity data. Processing is continued by a sequence object which fetches 136 the entity data and performs additional processing. According to the present invention, commonly executed routines can be stored as common objects, but flexibility in the order in which they are executed and details of how they are executed is provided.

INDUSTRIAL APPLICABILITY

The present invention relates to a distributed data processing system and particularly to a system for realizing distributed object oriented processing between terminals connected via a communication network. In a database system which is required to provide sophisticated functions for diversification of application modes in which a plurality of terminals are connected via a communication network, the man-hours required for system development increase as more sophisticated functions are added. A system with improved processing speed and reduced communication traffic requiring less development time is provided.

What is claimed is:

1. A distributed processing system, comprising:

a communication network to transmit messages, including data; and a plurality of terminals connected together by said communication network, each of said terminals capable of generating the messages, each of the messages having a terminal number for identifying one of said terminals to receive the message, a method code identifying processing of data and a command for identifying data to be processed, each of said terminals including a memory unit to store objects, including methods, at least one of the objects including a learning method for learning the data and the methods of the objects;

a processor, operatively connected to said communication network, to execute the methods stored in said memory unit; and a system table to store identifying information on the location and execution sequence of the methods stored in said memory unit, said processor updating said system table and the contents of said memory unit upon receipt of one of the messages from another terminal instructing said processor to execute the learning method stored in said memory unit.

2. A terminal in a distributed processing system, comprising:

object storage means for storing objects, including at least one object including a method;

system table means for storing identifying information on location and execution sequence of the objects stored in said object storage means; and decomposing means for decomposing the method in one of the objects into byte data in response to a transfer request;

transfer means for transferring the byte data decomposed by said decomposing means to another terminal upon completion of the decomposing and for receiving an updated object requested to be transferred to said terminal; and installation means for storing the updated object into said object storage means and for updating said system table means with an object name corresponding to the updated object.

3. A method for transferring programs in a distributed processing system executing objects in terminals, the objects inclusive of objects including a method, said method comprising:

(a) receiving a transfer request at a first terminal to transfer a selected object from the first terminal to a second terminal;

(b) decomposing the selected object into byte data in response to the transfer request;

(c) transferring the byte data decomposed in step (b) to the second terminal upon completion of said decomposing;

(d) receiving the byte data at the second terminal;

(e) composing the byte data to produce an updated object corresponding to the selected object requested to be transferred to the second terminal; and (f) storing the updated object and an object name, corresponding to the updated object, in the second terminal.

4. A method as recited in claim 3, wherein said decomposing in step (b) comprises the step of selecting one of the method and data in the selected object for said transferring in step (c).

5. A message transmitted between objects in a distributed processing system having a plurality of terminals connected by a communication network, said message comprising:

a terminal number for identifying one of the terminals to receive said message;

a method code identifying processing of data; and a command for identifying data to be processed, said command including a sequence file identifier identifying a sequence defined in a sequence file for executing objects, triggered by said message, in a defined order at a plurality of the terminals, said command including a selector condition and a reset condition when said method code identifies a common object, the selector condition determining how the common object executes and the reset condition determining how execution of the common object and any subsequent additional common objects ends.

6. A method for processing messages in a distributed processing system having a plurality of terminals connected by a communication network, said method comprising the steps of:

(a) determining in a first terminal, for a first message identifying a first object, whether the first object is stored in the first terminal;

(b) triggering the first object in the first terminal when said determining in step (a) determines that the first object is stored in the first terminal; and (c) generating a second message to a second terminal to locate the first object when said determining in step (a) determines that the first object is not stored in the first terminal.

7. A method as recited in claim 6, wherein all messages generated in the distributed processing system, including the second message generated in step (c), include a terminal number for identifying one of the terminals to receive the message and an object code, and wherein said method further comprises the steps of:

(d) determining whether the object code includes a sequence file identifier; and (e) executing sequence objects in a sequence determined by entries in a sequence file when said determining in step (d) determines that the object code includes the sequence file identifier.

8. A method as recited in claim 6, wherein all messages generated in the distributed processing system, including the second message generated in step (c), include a terminal number for identifying one of the terminals to receive the message and an object code, and wherein said method further comprises the steps of:

(d) storing common objects in at least one of the terminals;

(e) determining whether the object code includes a common object name, a selector condition and a reset condition;

(f) triggering a corresponding common object in dependence upon the common object name and the selector condition when said determining in step (e) determines that the object code includes the common object name, the selector condition and the reset condition; and (g) ending execution of the common objects in dependence upon the reset condition when said determining in step (e) determines that the object code includes the common object name, the selector condition and the reset condition.

9. A method as recited in claim 8, wherein said triggering in step (f) comprises the steps of:

(f1) comparing the selector condition with predetermined selector conditions in the corresponding common object; and (f2) executing condition steps in the corresponding common object identified by one of the predetermined selector conditions in dependence upon said comparing in step (f1).

10. A method as recited in claim 8, wherein said ending in step (g) comprises the steps of:

(g1) returning to the first object when the first message was determined in step (e) to contain the common object name of one of the common objects and the reset condition is set to return;

(g2) triggering a new sequence object when the reset condition is set to trigger; and (g3) terminating execution of the common objects without returning or triggering when the reset condition is set to terminate.

11. A method as recited in claim 6, wherein all messages generated in the distributed processing system, including the second message generated in step (c), include a terminal number for identifying one of the terminals to receive the message, a method code identifying processing of data and a command for identifying data to be processed.

12. A method as recited in claim 11, wherein said determining in step (a) comprises comparing the terminal number identifying the first terminal with the terminal number in the first message.

13. A method as recited in claim 12, wherein said generating in step (c) comprises setting the terminal number in the second message equal to the terminal number in the first message when said comparing in step (a) determines that the terminal in the first message is not equal to the terminal number of the first terminal.

14. A method as recited in claim 13, further comprising the steps of:

(d) storing method codes of each of the objects stored in each of the terminals in a command link file in each of the terminals, respectively, and all of the method codes for all of the objects stored in all of the terminals in a master system table;

(e) comparing the method code in the first message with the method codes in the command link file for the first terminal when said comparing in step (a) determines that the terminal number of the first message is unknown;

(f) executing step (b) when said comparing in step (e) determines that the method code in the first message is included in the message codes in the command link file for the first terminal; and (g) generating a third message to access the master system table when said comparing in step (e) determines that the method code in the first message is excluded from the message codes in the command link file for the first terminal.

15. A method as recited in claim 6, wherein said generating in step (c) comprises the step of (c1) generating the second message with a subset of a second object, and wherein said method further comprises the steps of:

(d) storing command names associated with each of the objects stored in each of the terminals in a command link file in each of the terminals, respectively;

(e) storing the subset of the second object in the second terminal upon receipt of the second message at the second terminal; and (f) storing a subset command name, corresponding to the subset of the second object, in the command link file of the second object.

16. A method as recited in claim 15, wherein said generating in step (c) further comprises the step of (c2) decomposing the second object into byte data prior to said generating in step (c1).

17. A method as recited in claim 16, wherein said generating in step (c2) comprises the step of transferring all of the byte data decomposed from the second object into the second message.

18. A method as recited in claim 16, wherein said generating in step (c2) comprises the step of transferring a method portion of the byte data decomposed from the second object into the second message.

* * * * *